(12) United States Patent
Brennecke et al.

(10) Patent No.: US 10,086,331 B2
(45) Date of Patent: Oct. 2, 2018

(54) CARBON DIOXIDE CAPTURE USING PHASE CHANGE IONIC LIQUIDS

(71) Applicant: University of Notre Dame du Lac, Notre Dame, IN (US)

(72) Inventors: Joan F. Brennecke, Notre Dame, IN (US); Edward J. Maginn, Notre Dame, IN (US); William F. Schneider, Notre Dame, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 0 days.

(21) Appl. No.: 15/034,464

(22) PCT Filed: Nov. 5, 2014

(86) PCT No.: PCT/US2014/064172
§ 371 (c)(1),
(2) Date: May 4, 2016

(87) PCT Pub. No.: WO2015/069799
PCT Pub. Date: May 14, 2015

(65) Prior Publication Data
US 2016/0288051 A1 Oct. 6, 2016

Related U.S. Application Data

(60) Provisional application No. 61/900,147, filed on Nov. 5, 2013.

(51) Int. Cl.
*B01D 53/62* (2006.01)
*B01D 53/77* (2006.01)
(Continued)

(52) U.S. Cl.
CPC ......... *B01D 53/83* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

| | | | |
|---|---|---|---|
| 4,621,089 A | 11/1986 | Ward | |
| 4,837,238 A | 6/1989 | Markwell | |

(Continued)

FOREIGN PATENT DOCUMENTS

| | | |
|---|---|---|
| EP | 0850933 | 7/1998 |
| EP | 1880754 | 1/2008 |

(Continued)

OTHER PUBLICATIONS

Wu et al., "Structure and Dynamics of Neat and CO2-Reacted Ionic Liquid Tetrabutylphosphonium 2-Cyanopyrrolide." Ind. Eng. Chem. Res. (2011), vol. 50, pp. 8983-8993.*

(Continued)

*Primary Examiner* — Daniel Berns
(74) *Attorney, Agent, or Firm* — Michael Best & Friedrich LLP

(57) ABSTRACT

Disclosed herein are methods for $CO_2$ capture that use phase change ionic liquids (PCILs) to remove the $CO_2$ from flue gas or other gas streams containing $CO_2$. PCILs have high $CO_2$ uptake and form a liquid PCIL-$CO_2$ complex when they react with C( )$_2$. When the liquid PCIL-$CO_2$ complex is heated to regenerate the solid PCIL material by removing the carbon dioxide, part of the heat needed to release the $CO_2$ can be supplied by the heat of fusion of the PCIL as it solidifies. Utilization of the heat of fusion of the PCIL to assist in its own regeneration can substantially reduce the parasitic energy loss associated with post-combustion $CO_2$ capture.

12 Claims, 4 Drawing Sheets

(51) Int. Cl.
  *B01D 53/78* (2006.01)
  *B01D 53/81* (2006.01)
  *B01D 53/83* (2006.01)
  *B01D 53/96* (2006.01)
  *B01D 53/14* (2006.01)
  *B01J 31/02* (2006.01)

(52) U.S. Cl.
  CPC ......... *B01D 53/1493* (2013.01); *B01D 53/62* (2013.01); *B01D 2251/80* (2013.01); *B01D 2252/30* (2013.01); *B01D 2257/504* (2013.01); *B01D 2258/0283* (2013.01); *Y02A 50/2342* (2018.01); *Y02C 10/04* (2013.01); *Y02C 10/06* (2013.01)

(56) References Cited

U.S. PATENT DOCUMENTS

| | | | |
|---|---|---|---|
| 5,228,897 | A | 7/1993 | Korte |
| 6,329,342 | B1 | 12/2001 | Kauffman |
| 6,415,614 | B1 | 7/2002 | Greenfield et al. |
| 6,579,343 | B2 | 6/2003 | Brennecke et al. |
| 6,639,076 | B1 | 10/2003 | Hauser |
| 2005/0129598 | A1 | 6/2005 | Chinn et al. |
| 2006/0211678 | A1 | 9/2006 | Ahmed |
| 2007/0295478 | A1 | 12/2007 | Schiflett et al. |
| 2008/0184880 | A1* | 8/2008 | Fan ............ B01D 53/002 95/40 |
| 2009/0005410 | A1 | 1/2009 | Charvat |
| 2009/0042910 | A1 | 2/2009 | Jung |
| 2009/0137580 | A1 | 5/2009 | Imamura |
| 2009/0325956 | A1 | 12/2009 | Taniguchi |
| 2010/0044620 | A1 | 2/2010 | Rached |
| 2010/0152159 | A1 | 6/2010 | Mitchell |
| 2011/0126563 | A1 | 6/2011 | Tang et al. |
| 2012/0134905 | A1 | 5/2012 | Kalb |
| 2012/0204717 | A1 | 8/2012 | Dinnage |
| 2012/0222557 | A1 | 9/2012 | Schneider et al. |
| 2013/0058852 | A1 | 3/2013 | Atkins et al. |
| 2013/0078170 | A1 | 3/2013 | Dai et al. |
| 2014/0319419 | A1 | 10/2014 | Broderick et al. |

FOREIGN PATENT DOCUMENTS

| | | |
|---|---|---|
| EP | 1950271 | 7/2008 |
| WO | WO 2005/113496 | 12/2005 |
| WO | WO 2008/044767 | 4/2008 |
| WO | WO 2008/124042 | 10/2008 |
| WO | WO 2010/023413 | 3/2010 |

OTHER PUBLICATIONS

Gurkan et al., "Molecular Design of High Capacity, Low Viscosity, Chemically Tunable Ionic Liquids for CO2 Capture", The Journal of Physical Chemistry Letters. Dec. 3, 2010. 1(24):3494-3499.

International Search Report and Written Opinion issued in application No. PCT/US2014/058366 dated Jan. 16, 2015.

International Search Report and Written Opinion issued in application No. PCT/US2010/055330 dated Feb. 18, 2011.

International Search Report and Written Opinion issued in application No. PCT/US2014/064172 dated Feb. 12, 2015.

Martin et al., "Thermodynamic analysis of absorption refrigeration cycles using ionic liquid+ supercritical C02 pairs.", The Journal of Supercritical Fluids, 55(2):852-859 (2010).

Steinbach et al., "Labeling of Aromatic Compounds with Carbon-11 in Ring Position", Synthesis and Applications of Isotopically Labelled Compounds, Proceedings of the International Symposium, 7th Dresden Germany Jun. 18-22, 2000.

Wang et al., "Carbon Dioxide Capture by Superbase-Derived Protic Ionic Liquids", Angewandte Chemie, International Edition, Coden: ACIEF5, 49(34):5978-5981 (Aug. 9, 2010).

* cited by examiner

CARBON DIOXIDE CAPTURE USING PHASE CHANGE IONIC LIQUIDS

RELATED APPLICATION INFORMATION

This application claims priority under 35 U.S.C. § 119(e) to U.S. Provisional Application No. 61/900,147 filed Nov. 5, 2013, the contents of which is hereby incorporated by reference in its entirety.

STATEMENT REGARDING FEDERALLY SPONSORED R&D

This invention was made with government support under Award No. DE-AR0000094 and Award No. DE-FG36-07NT43091 awarded by the Department of Energy. The government has certain rights in the invention.

BACKGROUND OF THE INVENTION

The utility sector produces roughly a third of the $CO_2$ emissions in the United States. Conventional coal-fired power plants currently produce over 50% of the electricity in the United States. Even with dramatic growth of power generation from renewable sources, this percentage is not expected to drop significantly in the next two decades. Therefore, capturing $CO_2$ from post-combustion flue gas is a major target in efforts to curb carbon emissions. The most mature technology for $CO_2$ capture is aqueous amine scrubbing, with monoethanolamine (MEA) most commonly used as the baseline. Unfortunately, the MEA process would result in a 28% parasitic energy loss and roughly double the cost of electricity. The heat required to regenerate the aqueous MEA solution is a major contributor to this parasitic energy loss. Accordingly, suitable materials and methods are still needed for capturing $CO_2$ from post-combustion flue gas.

SUMMARY OF THE INVENTION

In accordance with one embodiment, there is provided a method of removing carbon dioxide from a mixed gas, comprising exposing a phase-change ionic liquid (PCIL) in solid form to a gas comprising carbon dioxide, wherein the PCIL changes phase upon reaction with the carbon dioxide to form a liquid PCIL-$CO_2$ complex, and heating the liquid PCIL-$CO_2$ complex to produce carbon dioxide gas and regenerate the solid PCIL.

In accordance with one embodiment, there is provided a method of removing carbon dioxide from a mixed gas stream comprising passing a stream of gas comprising carbon dioxide through a first vessel containing an absorbent comprising a PCIL, wherein the PCIL changes phase upon reaction with the carbon dioxide to form a liquid PCIL-$CO_2$ complex; transporting the liquid PCIL-$CO_2$ complex to a regenerator; heating the liquid PCIL-$CO_2$ complex in the regenerator to produce carbon dioxide gas and regenerate the solid PCIL; and transporting the solid PCIL back to the first vessel.

The gas comprising carbon dioxide may be flue gas or exhaust gas produced from combustion of a fossil fuel, and in some embodiments is treated to remove water prior to contacting the PCIL. In certain embodiments, the PCIL, comprises a cation and an aprotic heterocyclic anion. Preferred cations include tetraalkylphosphonium cations such as tetrabutylphosphonium, butyltriethylphosphonium, tetraethylphosphonium, or tetramethylphosphonium. Preferred anions include 2-(trifluoromethyl)pyrazolide, 6-bromo-benzimidazolide, benzo[d]imidazol-1-ide, indazolide, or 2-cyanopyrrolide.

DETAILED DESCRIPTION OF PREFERRED EMBODIMENTS

Figure 1:
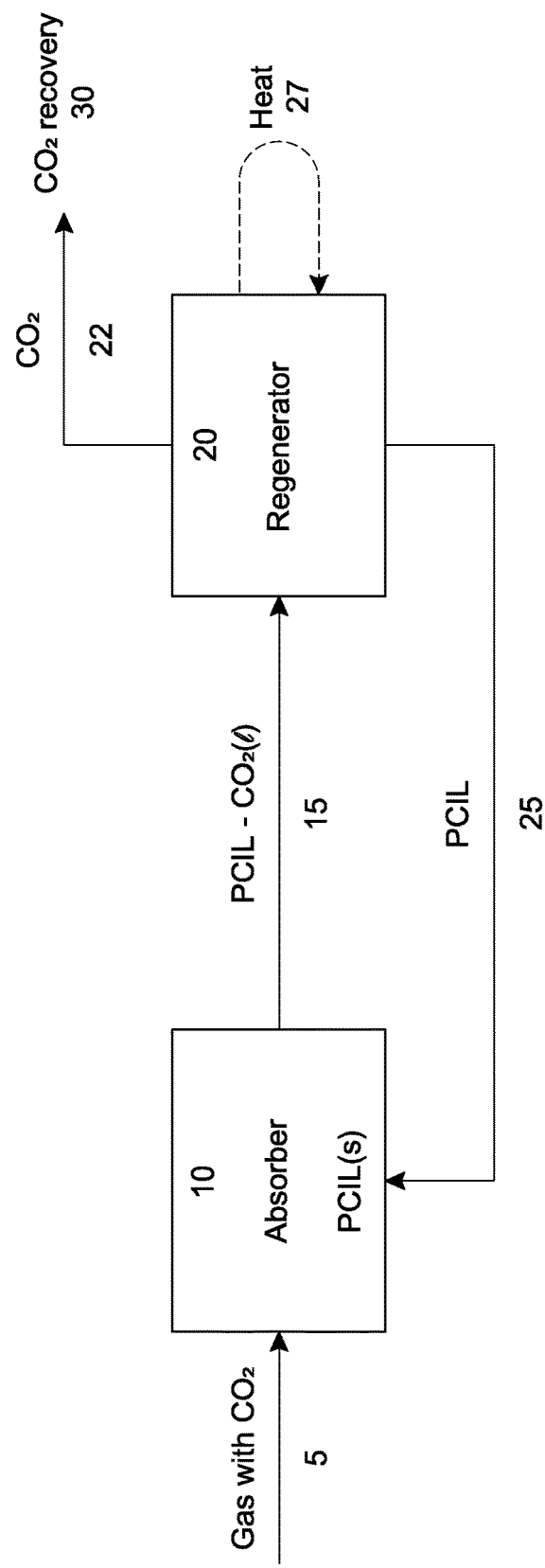
FIG. 1 is a schematic of a process of removing carbon dioxide from a mixed gas.

Disclosed herein are methods for $CO_2$ capture that use phase change ionic liquids (PCILs) to remove the $CO_2$ from flue gas or other gas streams containing $CO_2$. Certain solid ionic materials have high $CO_2$ uptake and form a liquid when they react with $CO_2$. When these same ionic materials are heated to regenerate the solid material by removing the carbon dioxide, part of the heat needed to release the $CO_2$ from the PCIL absorbent would be supplied by the heat of fusion of the PCIL as it solidifies. Since the heat of fusion of some salts is about half the typical heat of reaction of $CO_2$ with a functional group like an amine, the methods herein have the potential to cut the heat of regeneration by as much as a half. Utilization of the heat of fusion to assist in regeneration of the solid PCIL can substantially reduce the parasitic energy loss associated with post-combustion $CO_2$ capture.

The term PCIL as used herein refers any of a number of complex ionic compounds in which, at a given temperature, the compound exists in the solid state but changes to a liquid upon forming a complex with $CO_2$. Otherwise stated, the PCIL compound has a higher melting point than the PCIL-$CO_2$ complex. In certain embodiments, the uncomplexed PCIL exists in the solid state at a temperature range of about 0° C.-50° C. and changes to the liquid state upon reversibly binding with $CO_2$ to form a PCIL-$CO_2$ complex. In some embodiments, PCILs have a melting point, preferably greater than about 80° C., including greater than about 100° C., and greater than about 150° C., including about 100° C.-200° C. In some embodiments, PCILs have a heat of fusion ($\Delta H_{fus}$) of −30 to −2 kJ/mol, including about −20 to −10 kJ/mol. In some embodiments, the PCIL comprises an aprotic heterocyclic anion (AHA), where a heteroatom is nitrogen. Examples of preferred PCILs are provided in Table 1 below infra. Further examples of AHAs and ionic compounds that may be useful in PCILs are disclosed in WO 2011/056895, which is hereby incorporated by reference in its entirety. Such AHAs that ma be useful in PCILs include the following:

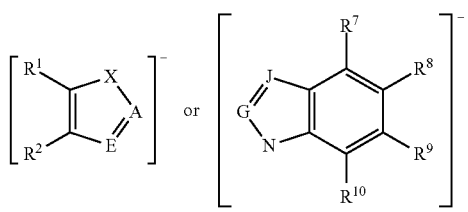
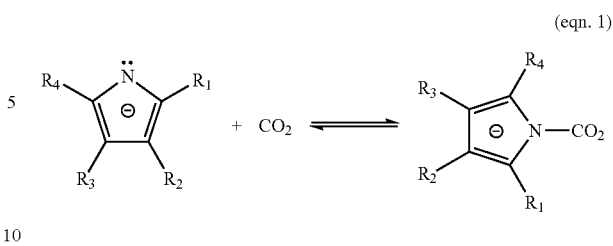

(eqn. 1)

wherein X is N;
A is N or CR³;
E is N or CR⁴;
G is N or CR⁵;
J is N or CR⁵; and
$R^1$, $R^2$, $R^3$, $R^4$, $R^5$, $R^6$, $R^7$, $R^8$, $R^9$, and $R^{10}$ are independently halo, CN, CNO, NCO, $NO_2$, $R^{11}$, $OR^{11}$, $SR^{11}$, $NR^{12}R^{13}$, —$YC(O)ZR^{11}$, $SO_2R^{11}$, $SO_3R^{11}$, or $SO_2NR^{12}R^{13}$;

Y is a single bond, optionally substituted $C_{1-6}$ hydrocarbyl, —$N(R^{12})$—, O, or S;

Z is a single bond, —$N(R^{12})$—, O, or S;

each $R^{11}$ is H or optionally substituted $C_{1-2}$ hydrocarbyl; and each $R^{12}$ and each $R^{13}$ is independently H or optionally substituted $C_{1-6}$ hydrocarbyl.

Preferred ring structures for the anion include pyrrolide, pyrazolide and imidazolide. The simple mechanism of reaction of $CO_2$ with a typical AHA anion is shown in equation 1.

Preferred PCILs have improved properties as compared to known amines regarding binding of $CO_2$. When amines are tethered to the cation of an ionic compound, they react with $CO_2$ in the same stoichiometry as with amine molecules like monoethanolamine, namely that two amines are needed for each $CO_2$. Although that capacity can be increased substantially to one amine for each $CO_2$ if the amine is tethered to the anion, some such tethered anions when complexed with carbon dioxide exhibit very high viscosities. PCILs including AHAs, do not exhibit undesirably high viscosities when complexed with $CO_2$ and also bind about one mole of $CO_2$ for every mole of PCIL. In some embodiments, the viscosity of a PCIL-$CO_2$ complex at 30° C. is preferably less than about 2000 cP, including less than about 500 cP and less than about 300 cP.

Examples of preferred PCILs are below in Table 1.

TABLE 1

| | Structure | Name | Shorthand |
|---|---|---|---|
| 1 | ![structure] | Tetrabutylphosphonium 2-cyanopyrrol-1-ide | [P₄₄₄₄][CNpyr] |
| 2 | ![structure] | Tetrabutylphosphonium 2-(Trifluoromethyl)pyrazolide | [P₄₄₄₄][CF₃pyra] |
| 3 | ![structure] | Tetrabutylphosphonium 6-Bromo-benzimidazolide | [P₄₄₄₄][BrBnim] |
| 4 | ![structure] | Tetrabutylphosphonium Benzo[d]imidazol-1-ide | [P₄₄₄₄][BnIm] |
| 5 | ![structure] | Butyltriethylphosphonium Benzo[d]imidazol-1-ide | [P₂₂₂₄][BnIm] |

TABLE 1-continued

| | Structure | Name | Shorthand |
|---|---|---|---|
| 6 | (Tetraethylphosphonium cation with indazolide anion) | Tetraethylphosphonium indazolide | [P$_{2222}$][Inda] |
| 7 | (Tetraethylphosphonium cation with 2-cyanopyrrol-1-ide anion) | Tetraethylphosphonium 2-cyanopyrrol-1-ide | [P$_{2222}$][CNpyr] |
| 8 | (Tetraethylphosphonium cation with benzimidazolide anion) | Tetraethylphosphonium benzimidazolide | [P$_{2222}$][BnIm] |
| 9 | (Tetramethylphosphonium cation with benzimidazolide anion) | Tetramethylphosphonium benzimidazolide | [P$_{1111}$][BnIm] |

Although it has been found that the cation of the PCIL does not appear to play a significant role in determining $CO_2$ binding capacity, it can have an effect on physical properties such as melting point. In certain embodiments, tetraalkylphosphonium cations are chosen because they tend to have higher decomposition temperatures compared to other cations.

It should be noted that the cations in the PCILs can be readily changed to other cations, including other tetraalkylphosphonium cations, accordingly, any of the anions 2-(trifluoromethyl)pyrazolide, 6-bromo-benzimidazolide, benzo[d]imidazol-1-ide, indazolide, and 2-cyanopyrrolide can be paired with any of the cations tetrabutylphosphonium, butyltriethylphosphonium, tetraethylphosphonium, and tetramethylphosphonium, as well as other tetraalkylphosphoniums wherein the alkyls are the same or different and selected from $C_1$-$C_4$ hydrocarbons either straight chain or branched.

Additional cations that may be useful include quaternary nitrogen-containing cations, including cyclic, aliphatic, and aromatic quaternary nitrogen-containing cations such as n-alkyl pyridinium, a dialkyl pyrrolidinium, a dialkyl imidazolium, or an alkylammonium of the formula $R'_{4-X}NH_X$ wherein X is 0-3 and each R' is independently an alkyl group having 1 to 18 carbon atoms. In some embodiments, unsymmetrical cations may provide lower melting temperatures. Other phosphonium cations include, cyclic, aliphatic, and aromatic phosphonium cations, including those of the formula $R''_{4-X}PH_X$ wherein X is 0-3, and each R'' is an alkyl or aryl group such as an alkyl group having 1 to 18 carbon atoms or a phenyl group. Examples of sulfonium cations include, but are not limited to cyclic, aliphatic, and aromatic sulfonium cations. For example, the sulfonium cations include those of the formula $R'''_{3-X}SH_X$ wherein X is 0-2 and each R''' is an alkyl or aryl group such as an alkyl group having 1 to 18 carbon atoms or a phenyl group. Additional more specific examples may include, but are not limited to, ammonium, imidazolium, phosphonium, 1-butyl-3-methylimidazolium, 1-decyl-3-methylimidazolium, 1-dodecyl-3-methylimidazolium, 1-ethyl-3-butylimidazolium, 1-hexyl-3-methylimidazolium, 1-hexylpyridinium, 1-methy-3-butylimidazolium, 1-methy-3-decyl imidazolium, 1-methy-3-dodecylimidazolium, 1-methy-3-ethylimazolium, 1-methy-3-hexadecyl imidazolium, 1-methy-3-hexylimidazolium, 1-methy-3-octadecyl imidazolium, 1-methy-3-octyl imidazolium, 1-methy-3-propyl imidazolium, 1-octyl-3-methylimidazolium, 1-octylpyridinium, benzylpyridinium, N-butyl pyridinium, ethylpyridinium, and ethylene pyridinium. Other examples of suitable cations are known in the art. For example, US2006/0197053, US2008/0028777, and US2007/0144186, all of which are incorporated by reference in their entireties, describe a number of suitable cations, and any of these cations may be used with an anion described herein.

Recognizing that the large viscosity changes in previously considered $CO_2$-philic ionic liquids has its origins in hydrogen bonding networks that are set up in the reacted/complexed compounds, pyrrolide ions were designed that would circumvent this hydrogen-bonding mechanism. By varying the functional groups attached to the pyrrolide ion it is possible to tune the strength of $CO_2$ bonding.

Similar control can be exerted over the melting temperature by managing the intermolecular interaction differences between unreacted and reacted state. The solid state is a low entropy, low energy state, in which the free energy costs of high order (low entropy) are offset by the energetic stability associated with this order. The liquid is a higher entropy, higher energy state, in which the free energy cost of diminished intermolecular interactions are offset by higher entropy. By exploiting changes in these competing factors between the unreacted and reacted states, different melting points can be achieved. In this case it is preferable for the reacted form of the material to be biased towards the liquid state; that is, to favor disorder due to weaker intermolecular interactions. One way to drive this change is by altering the reaction mechanism in such a way as to induce a significant conformational change in the product. For example, in the certain materials, changes from the more symmetric pyrrolide to the less-symmetric reacted form are sufficient to induce a modest melting point difference. In both forms the molecule retrains planar due to π bonding interactions between anion and $CO_2$. Altering this π bonding to bias the product to a non-planar form should have a much more dramatic effect on melting point.

These factors may be used to perform simulations to determine candidate compounds which then may be tested in the laboratory. Additional experimental information may be found in Seo, et al., *Phase-Change Ionic Liquids for Post-combustion $CO_2$ Capture*, Energy & Fuels, vol. 28, pp. 5968-77 (2014), the contents of which is incorporated by reference in its entirety.

In its simplest form, a method of removing $CO_2$ from a mixed gas stream includes exposing the gas to a solid PCIL. The solid PCIL reacts with the $CO_2$ to form a liquid PCIL-$CO_2$ complex, thereby removing $CO_2$ from the mixed gas stream. The solid PCIL can be regenerated by heating to liberate the $CO_2$ gas, which can then be recovered.

A schematic of one embodiment of a process to remove $CO_2$ from a mixed gas stream is shown in FIG. 1. A gas containing $CO_2$ 5 is fed into a first vessel referred to as an absorber 10. The $CO_2$-containing gas may be from any source, such as flue gas or exhaust gas from the burning of a fossil fuel. The absorber 10 contains an absorbent and/or adsorbent comprising at least one PCIL. The PCIL is in solid form and reacts with $CO_2$ to form a liquid PCIL-$CO_2$ complex. During the process, as $CO_2$-containing gas passes through the absorber there may be a combination of solid PCIL and liquid PCIL-$CO_2$ complex in the absorber 10. The reaction to form the PCIL-$CO_2$ complex is exothermic, such that some embodiments of absorber 10 include a cooling jacket or other means to remove heat from the absorber. In certain embodiments, the temperature of the absorber 10 is maintained in the range of about 50° C.-90 C, including about 60° C.-80° C., and about 60° C.-70° C.

The liquid PCIL-$CO_2$ complex can then be transported 15 to a second vessel referred to herein as a regenerator 20. The regenerator 20 is heated to release the $CO_2$ and regenerate the solid PCIL. In certain embodiments, the regenerator operates at temperatures above about 80° C., including over 100° C. In some embodiments, the regenerator is a spray tower wherein the liquid complex is sprayed into the vessel to enhance the liberation of carbon dioxide and concomitant solidification. Once it is liberated, the $CO_2$ leaves the regenerator 22. The $CO_2$ may be recovered 30 and compressed or otherwise treated. The regenerated solid PCIL can then be transported 25 back to the absorber 10 and reused.

The heat generated by the solidification of the PCIL (i.e. the $\Delta H_{fus}$) 27 also helps to heat the regenerator. The ability to use the natural heat released as part of regeneration of the solid reduces the energy input needed to heat the vessel. This reduces the amount of energy needed to operate the $CO_2$ scrubbing system, also called parasitic energy loss, as compared to systems that do not include phase-changing materials. In some embodiments, heat removed from the absorber may also be used to heat the regenerator.

In some embodiments, a single vessel is used for both reaction and regeneration. In such embodiments, the $CO_2$-containing gas feed is diverted or otherwise discontinued from entering into the vessel, and the vessel is heated to liberate the $CO_2$ gas and regenerate the solid PCIL. Once the regeneration has been completed to the desired extent, the vessel containing solid PCIL may be exposed to a $CO_2$-containing gas feed once again.

In some embodiments, the $CO_2$-containing gas stream is treated to remove water before it reaches the PCIL in the absorber 10.

Figure 2:
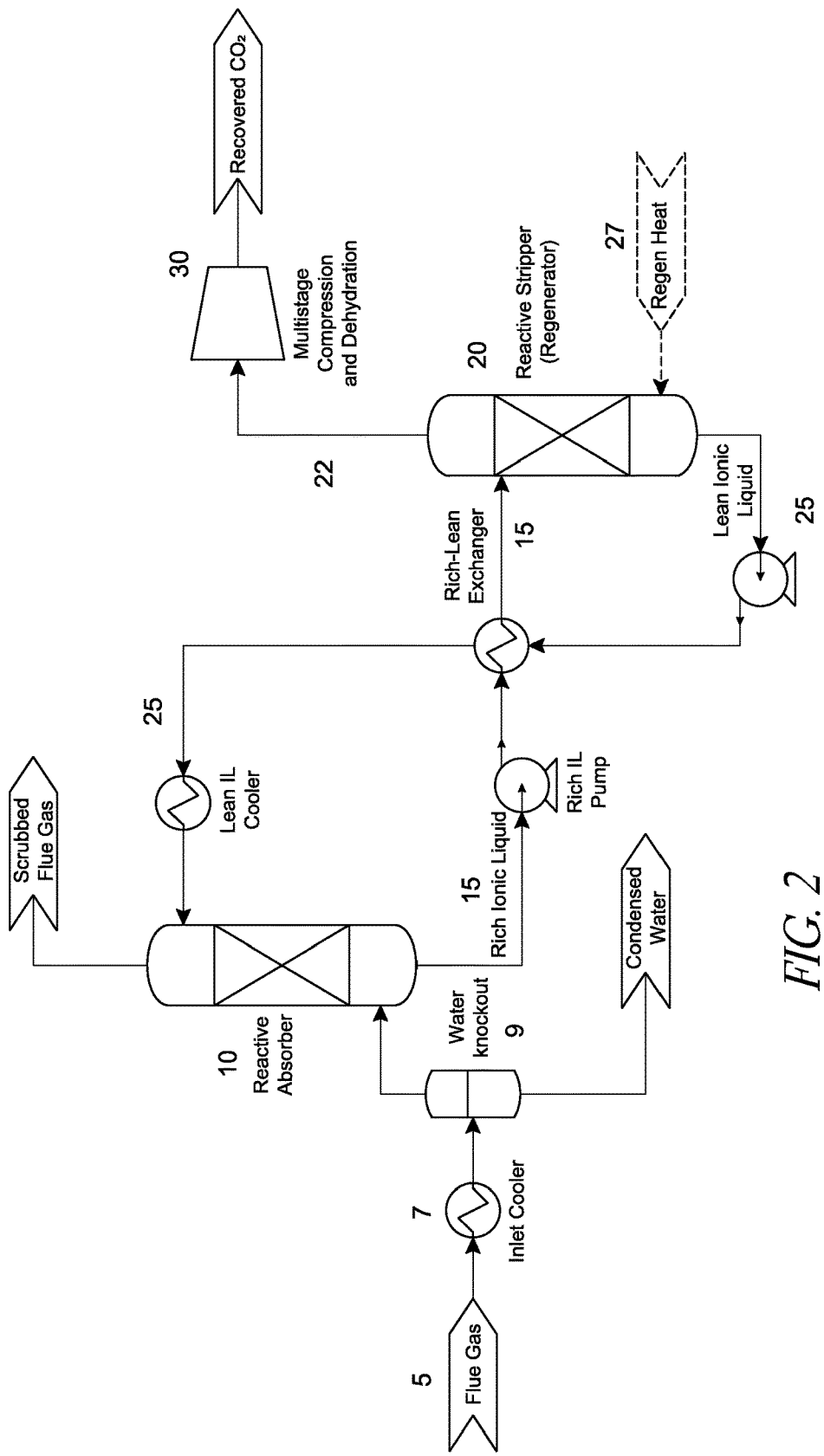
FIG. 2 is a schematic of one embodiment of a system for removing carbon dioxide from a mixed gas stream.

One embodiment of an apparatus carrying out the methods described herein is found in FIG. 2. The conditions and options noted above for FIG. 1 are also applicable to FIG. 2.

The $CO_2$-containing gas feed 5, which may be a flue gas, is passed through an optional cooler 7 to reduce the temperature of the gas, and may also be passed through an optional water removal or reduction system 9. Another possible option is for the cooler and water removal/reduction to take place in a single apparatus. Any of a wide variety of methods may be employed to remove water, including condensation or use of hydrophilic or hygroscopic materials.

The gas then passes into the absorber 10 where it is exposed to the solid PCIL. The absorber may be temperature controlled as discussed above. The $CO_2$ gas then reacts with PCIL to make a liquid PCIL-$CO_2$ complex 15 (which may also be referred to as "rich ionic liquid" because it is rich in $CO_2$) which is then pumped out of the absorber 10 and into the regenerator 20.

The regenerator 20 is heated to release the $CO_2$ and regenerate the solid PCIL. The $\Delta H_{fus}$ heat generated by the solidification of the PCIL 27 also helps to heat the regenerator. The $CO_2$ 22 leaves the regenerator and is optionally compressed and/or dehydrated as needed 30. The regenerated solid PCIL (also referred to as "lean IL") can then be transported 25 back to the absorber 10 and reused. The lean IL may also be cooled prior to going back to the absorber if desired to help maintain the desired temperature in the absorber 10.

The ability to use the natural heat released as part of regeneration of the solid reduces the energy input needed to heat the vessel. This reduces the amount of energy needed to operate the $CO_2$ scrubbing system, also called parasitic energy loss, as compared to systems that do not include phase-changing materials. In some embodiments, heat removed from the absorber may also be used to heat the regenerator.

Figure 3:
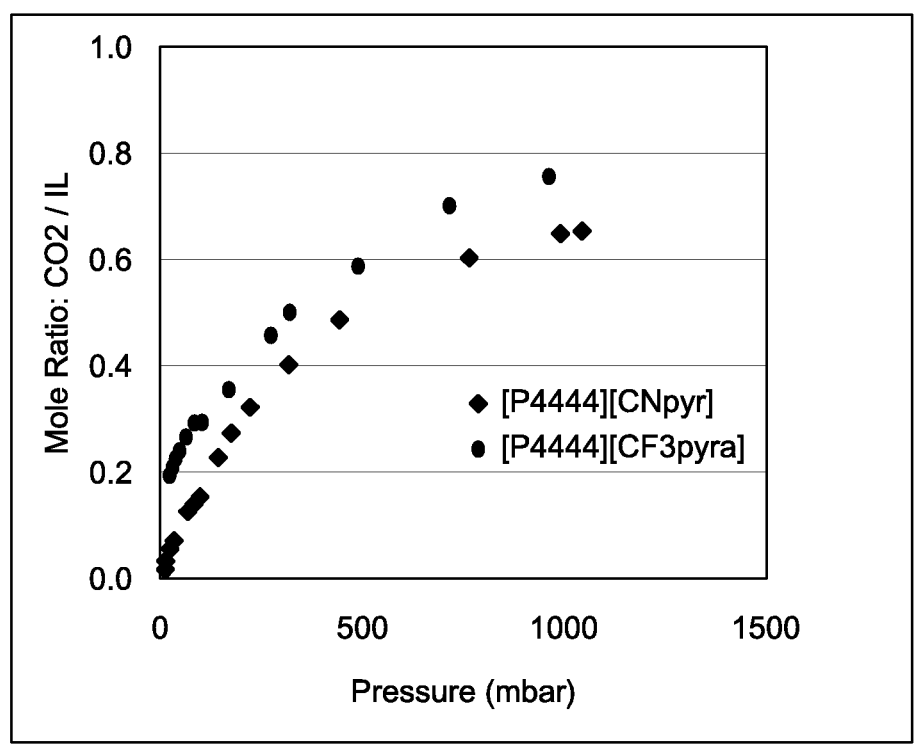
FIG. 3 illustrates the carbon dioxide uptake of tetrabutylphosphonium 2-(trifluoromethyl)pyrazolide and tetrabutylphosphonium cyanopyrrolide at 60° C.
Figure 4:
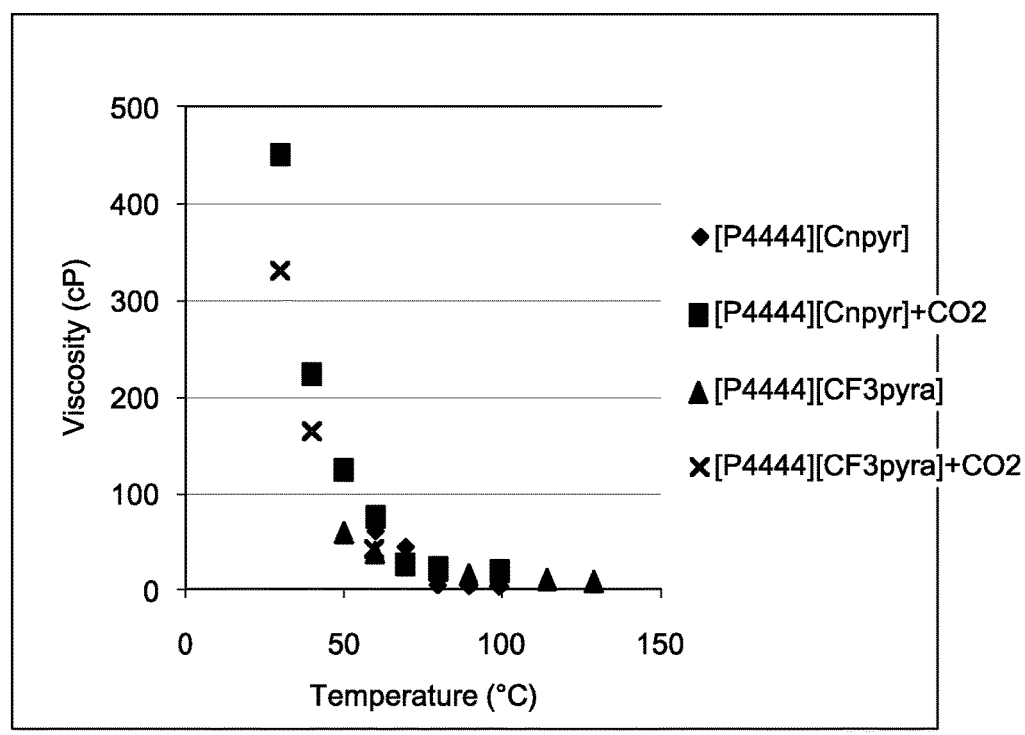
FIG. 4 illustrates the viscosities of tetrabutylphosphonium 2-(trifluoromethyl)pyrazolide and tetrabutylphosphonium cyanopyrrolide before and after reaction with carbon dioxide.

As examples, [P$_{4444}$] [CF$_3$pyrazolide] and [P$_{4444}$][cyanopyrrolide] are solids at room temperature. Their normal melting points (as measured by differential scanning calorimetry) are ~40° C. At room temperature and with 1 bar $CO_2$ pressure the solids begin to melt. Because mass transfer to the solid was too slow to quickly measure equilibrium $CO_2$ uptakes of the solids, the solids were melted and the $CO_2$ uptake measured at 60° C. Those absorption isotherms are shown in FIG. 3. Clearly, the $CO_2$ uptake is extremely high, almost approaching 1 $CO_2$ molecule for each anion. Additionally, the viscosities as a function of temperature were measured before and after reaction with $CO_2$. These data are shown in FIG. 4. First, note that the viscosity of the mixture remains below 500 cP so that the liquid is capable of being transported using a pump. Second, note that measurements of the viscosity of the [P$_{4444}$][CF$_3$pyrazolide]/$CO_2$ complex were possible down to 30° C. It was only at 25° C. that the sample began to solidify. The viscosity for the $CO_2$-saturated [P$_{4444}$][cyanopyrrolide] was measurable down to 10° C. Thus, the melting point of the PCIL/$CO_2$, complex appears to be approximately 15-30° C. below the melting point of the pure PCIL. These compounds demonstrate that the processes shown in FIGS. 1 and 2, with their potential large reductions in parasitic energy requirements, are possible.

While certain embodiments of the disclosure have been described, these embodiments have been presented by way of example only, and are not intended to limit the scope of the disclosure. Indeed, the novel methods, systems, and devices described herein may be embodied in a variety of other forms. For example, embodiments of one illustrated or described process or apparatus can be combined with embodiments of another illustrated or described process or apparatus. Some embodiments have been described in connection with the accompanying drawings. However, it should be understood that the figures are not drawn to scale. Distances, angles, plumbing arrangements, etc. are merely illustrative and do not necessarily bear an exact relationship to actual dimensions and layout of the systems illustrated. Components can be added, removed, and/or rearranged. Furthermore, various omissions, substitutions and changes in the form of the methods, systems, and devices described herein may be made without departing from the spirit of the disclosure.

Conditional language, for example, among others, "can," "could," "might," or "may," airless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method of removing carbon dioxide from a mixed gas stream, comprising:
    passing a stream of gas comprising carbon dioxide through a first vessel containing an absorbent comprising a PCIL, wherein the PCIL changes phase upon reaction with the carbon dioxide to form a liquid PCIL-$CO_2$ complex;
    transporting the liquid PCIL-$CO_2$ complex to a regenerator;
    heating the liquid PCIL-$CO_2$ complex in the regenerator to produce carbon dioxide gas and regenerate the solid PCIL; and
    transporting the solid PCIL back to the first vessel.

2. The method of claim 1, wherein the gas comprising carbon dioxide is flue gas or exhaust gas produced from combustion of a fossil fuel.

3. The method of claim 1, wherein the PCIL comprises a tetraalkylphosphonium cation and an anion selected from the group consisting of 2-(trifluoromethyl)pyrazolide, 6-bromo-benzimidazolide, benzo[d]imidazol-1-ide, and indazolide.

4. The method of claim 3, wherein the tetraalkylphosphonium cation is selected from the group consisting of tetrabutylphosphonium, butyltriethylphosphonium, tetraethylphosphonium, and tetramethylphosphonium.

5. The method of claim 1, wherein the gas comprising carbon dioxide is treated to remove water prior to contact with the PCIL.

6. The method of claim 1, wherein the PCIL is selected from the group consisting of tetrabutylphosphonium 2-(trifluoromethyl)pyrazolide, tetrabutylphosphonium 6-bromo-benzimidazolide, tetrabutylphosphonium benzo[d]imidazol-1-ide, butyltriethylphosphonium benzo[d]imidazol-1-ide, tetraethylphosphonium indazolide tetraethylphosphonium benzo[d]imidazol-1-ide, and tetramethylphosphonium benzo[d]imidazol-1-ide.

7. A method of removing carbon dioxide from a mixed gas, comprising:
    exposing a phase-change ionic liquid (PCIL) in solid form to a gas comprising carbon dioxide, wherein the PCIL changes phase upon reaction with the carbon dioxide to form a liquid PCIL-$CO_2$ complex; and
    heating the liquid PCIL-$CO_2$ complex to produce carbon dioxide gas and regenerate the solid PCIL.

8. The method of claim 7, wherein the gas comprising carbon dioxide is flue gas or exhaust gas produced from combustion of a fossil fuel.

9. The method of claim 7, wherein the PCIL comprises a tetraalkylphosphonium cation and an anion selected from the group consisting of 2-(trifluoromethyl)pyrazolide, 6-bromo-benzimidazolide, benzo[d]imidazol-1-ide, and indazolide.

10. The method of claim 9, wherein the tetraalkylphosphonium cation is selected from the group consisting of tetrabutylphosphonium, butyltriethylphosphonium, tetraethylphosphonium, and tetramethylphosphonium.

11. The method of claim 7, wherein the gas comprising carbon dioxide is treated to remove water prior to contact with the PCIL.

12. The method of claim 7, wherein the PCIL is selected from the group consisting of tetrabutylphosphonium 2-(trifluoromethyl)pyrazolide, tetrabutylphosphonium 6-bromo-benzimidazolide, tetrabutylphosphonium benzo[d]imidazol-1-ide, butyltriethylphosphonium benzo[d]imidazol-1-ide, tetraethylphosphonium indazolide, tetraethylphosphonium benzo[d]imidazol-1-ide, and tetramethylphosphonium benzo[d]imidazol-1-ide.

\* \* \* \* \*